Dec. 11, 1951   E. VAN DER PYL   2,577,935
TUNNEL KILN
Filed Nov. 2, 1948   9 Sheets-Sheet 1
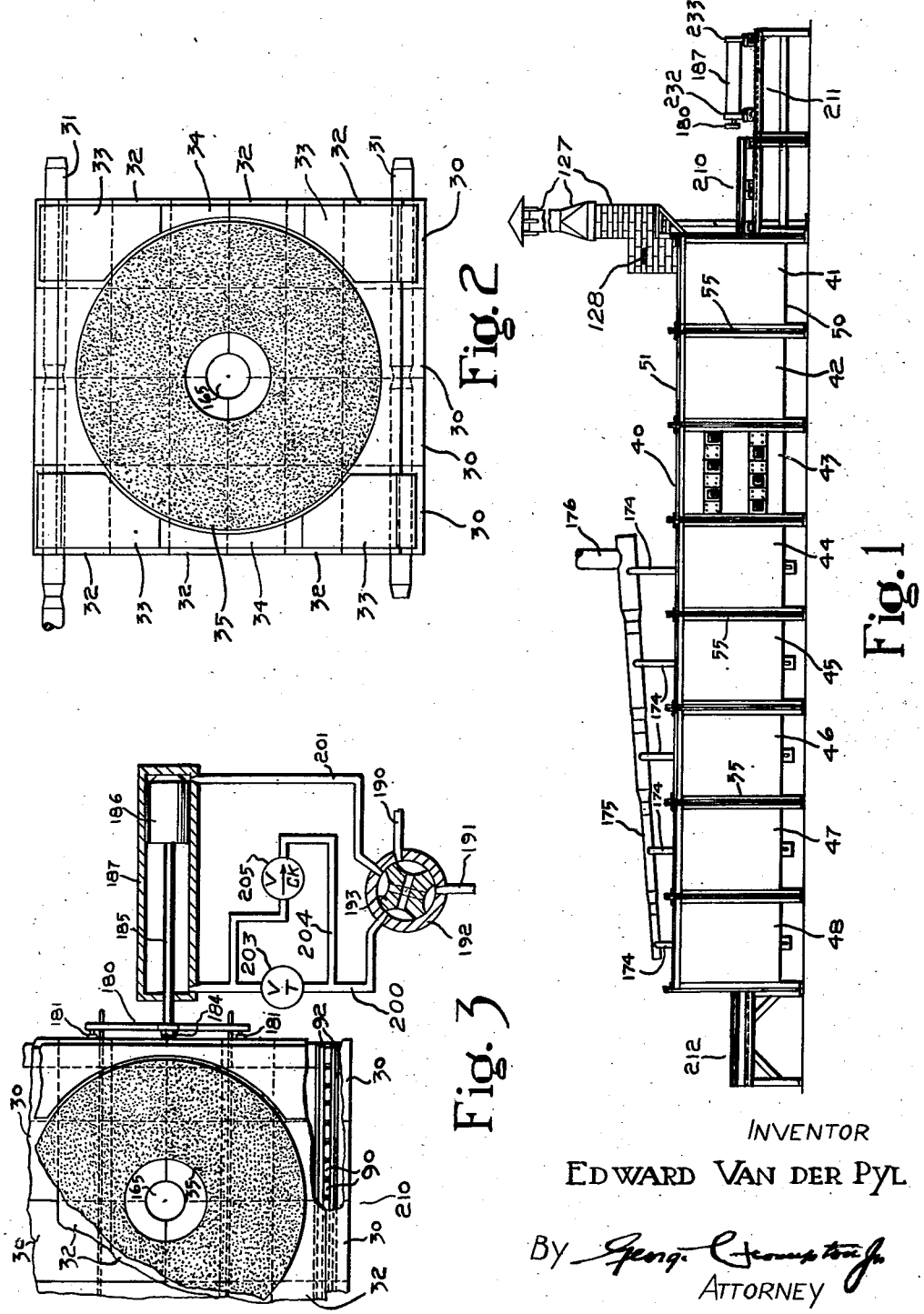
INVENTOR
EDWARD VAN DER PYL
By *George C. [signature]*
ATTORNEY Dec. 11, 1951  E. VAN DER PYL  2,577,935
TUNNEL KILN
Filed Nov. 2, 1948  9 Sheets-Sheet 2
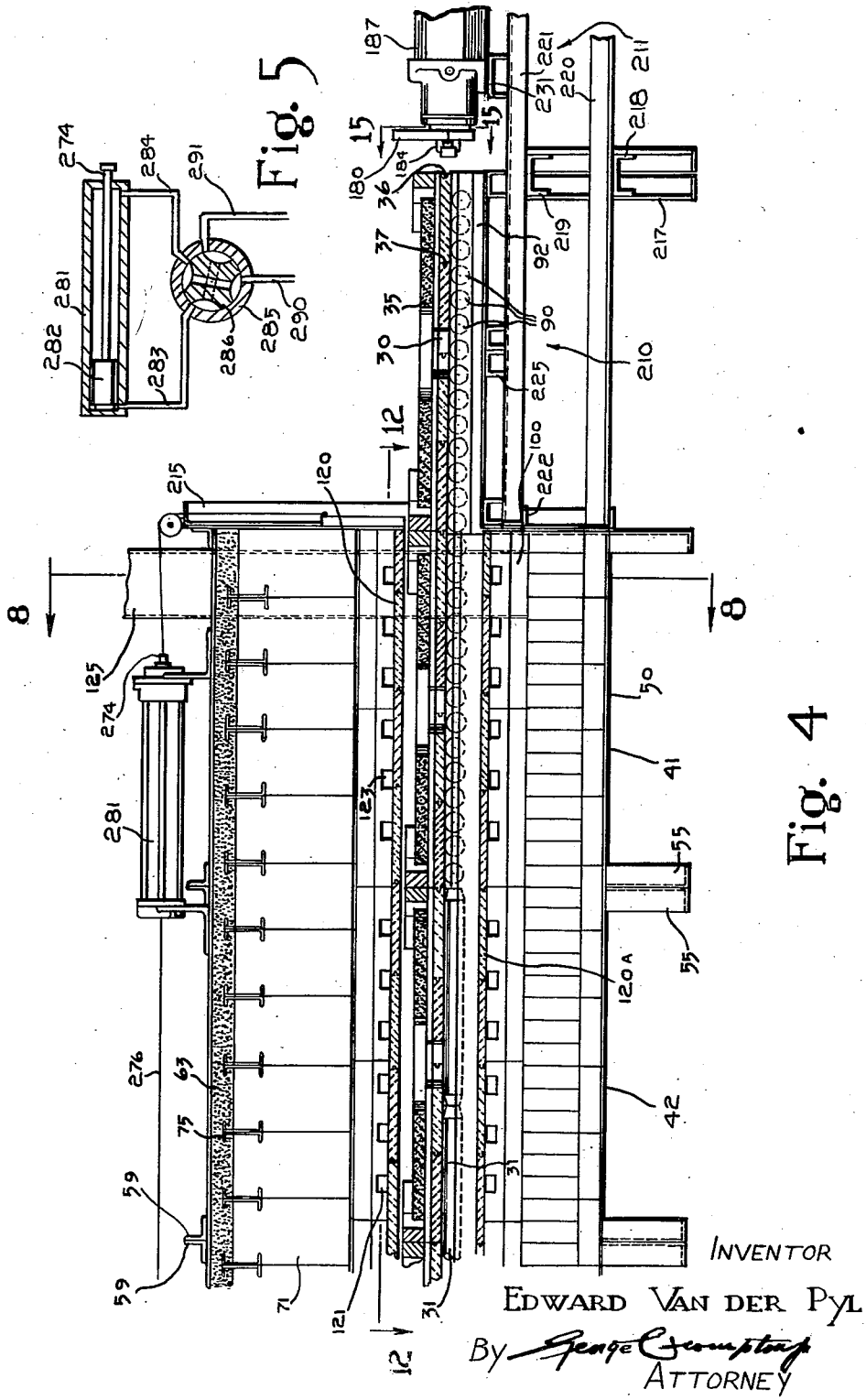
INVENTOR
EDWARD VAN DER PYL
By George C. Crompton
ATTORNEY

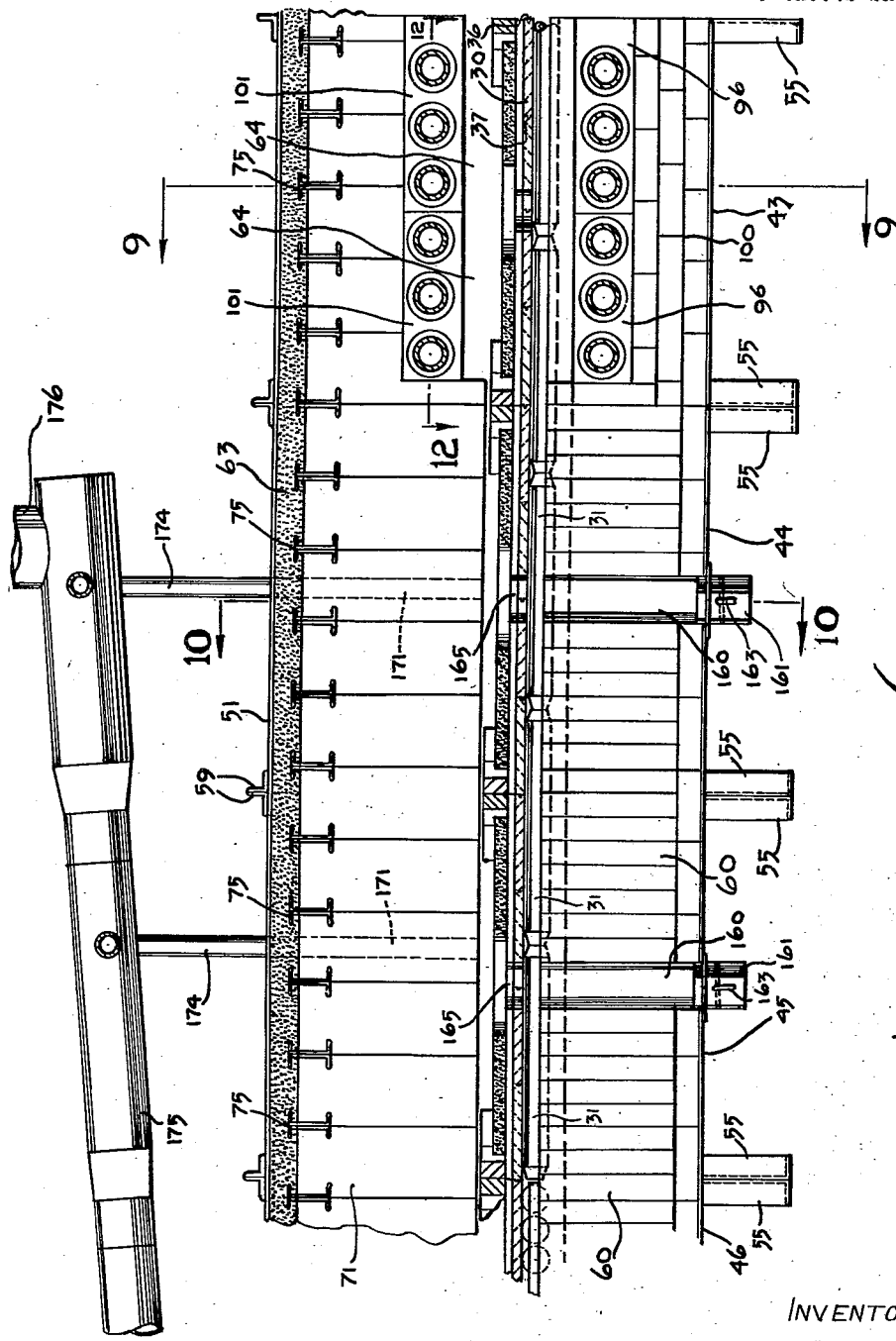

Dec. 11, 1951  E. VAN DER PYL  2,577,935
TUNNEL KILN
Filed Nov. 2, 1948  9 Sheets-Sheet 4

INVENTOR
EDWARD VAN DER PYL
By George Crompton Jr.
ATTORNEY

INVENTOR
EDWARD VAN DER PYL
By George Crompton Jr.
ATTORNEY

INVENTOR
EDWARD VAN DER PYL

By
ATTORNEY

Dec. 11, 1951 E. VAN DER PYL 2,577,935
TUNNEL KILN
Filed Nov. 2, 1948 9 Sheets-Sheet 7

INVENTOR
EDWARD VAN DER PYL
By George Crompton Jr.
ATTORNEY

Dec. 11, 1951     E. VAN DER PYL     2,577,935
TUNNEL KILN
Filed Nov. 2, 1948     9 Sheets-Sheet 8
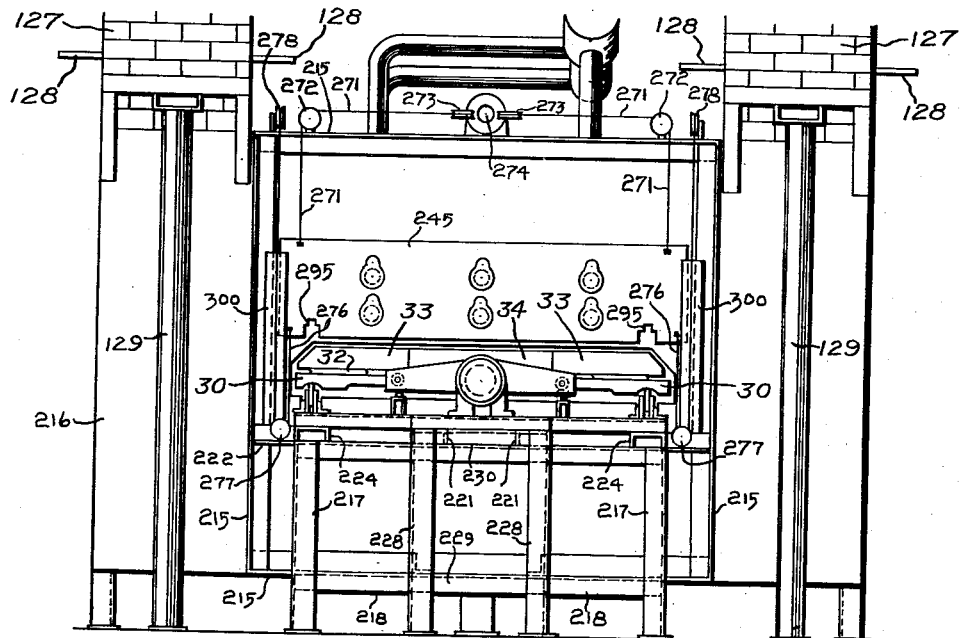
Fig. 13
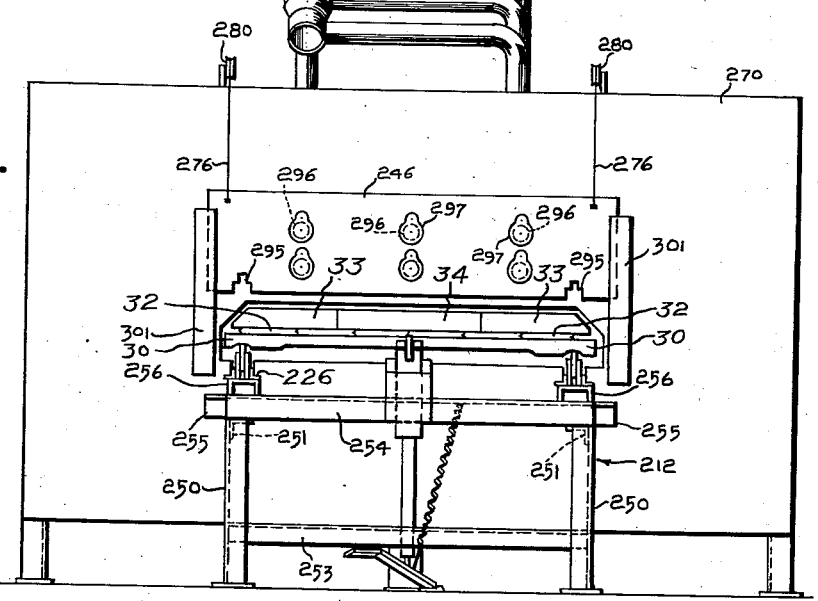
Fig. 14
Fig. 15     Fig. 16
INVENTOR
EDWARD VAN DER PYL
By George Crompton
ATTORNEY Dec. 11, 1951  E. VAN DER PYL  2,577,935
TUNNEL KILN
Filed Nov. 2, 1948  9 Sheets-Sheet 9
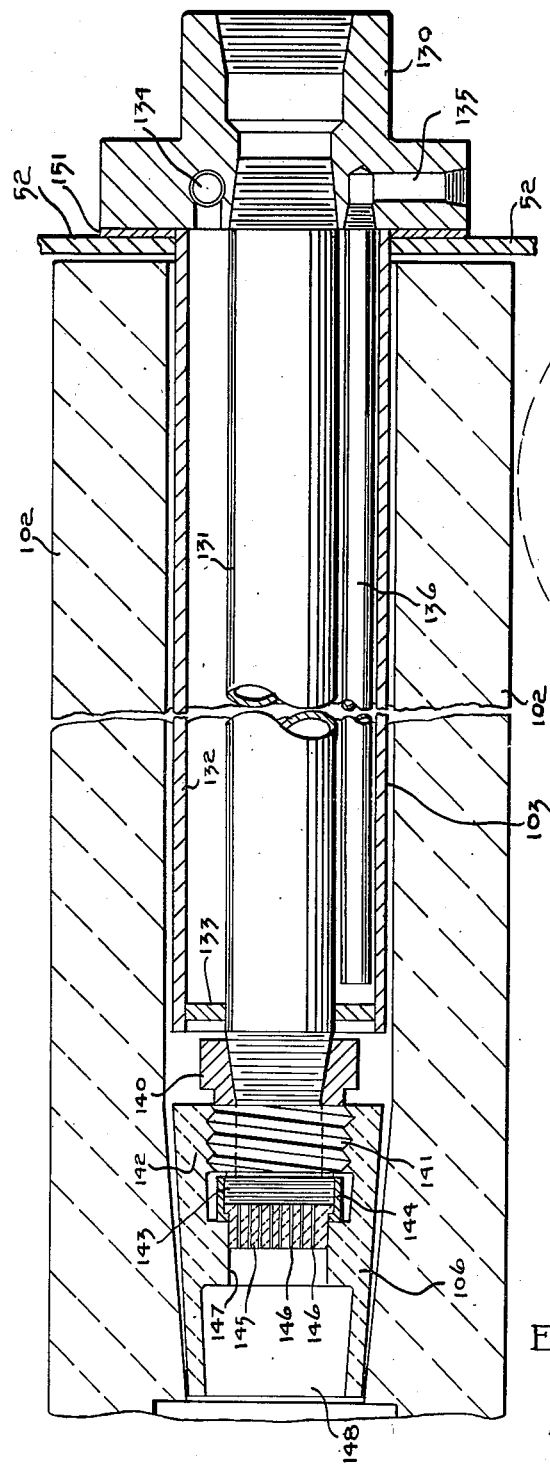
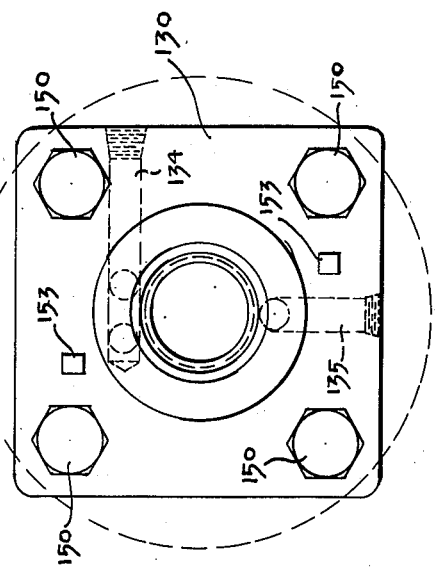
Fig.17
Fig.18
INVENTOR
EDWARD VAN DER PYL
By *George C. Trompton Jr.*
ATTORNEY Patented Dec. 11, 1951

2,577,935

UNITED STATES PATENT OFFICE 2,577,935

TUNNEL KILN

Edward Van der Pyl, Holden, Mass., assignor to Norton Company, Worcester, Mass., a corporation of Massachusetts Application November 2, 1948, Serial No. 57,999

7 Claims. (Cl. 25—142)

1

The invention relates to tunnel kilns.

One object of the invention is to provide a small light weight tunnel kiln capable of vitrifying grinding wheels up to 42 inches in diameter. Another object of the invention is to provide a tunnel kiln and arrangement of batts and furniture so that what passes through the tunnel has a mass of the order of only twice or three times the mass of the ware to be vitrified instead of many times the mass of the ware to be vitrified. Another object of the invention is to provide a tunnel kiln having no railway cars or the like and which can be fired by gas. Another object is to provide a tunnel kiln having no railway cars or the like which uniformly heats the ware, that is to say avoids substantial differentials of temperature. Another object is to provide a compartmented tunnel kiln of simple construction which is easy to operate and having no metal parts in the firing zone. Another object is to provide a tunnel kiln in which the conveyors for the ware are refractory batts and in which there is no metal in the firing zone, but having anti-friction devices to support the batts for movement in the preheating zone and in the annealing zone whereby heavy batts can be used to support large grinding wheels to be vitrified, yet the ram pressure against the batts will not cause smashes in the tunnel.

Another object of the invention is to provide a gas fired kiln arranged to produce horizontal planes of radiant energy above and below the batts carrying the ware through the kiln and close to them whereby quickly to raise the temperature of the ware without creating heat differentials. Another object is to provide a gas fired kiln having two banks of refractory combustion tubes in the upper and lower part of the tunnel respectively and an arrangement of flues for heating the upper and lower part of the tunnel by exhaust gases in the preheating zone. Another object is to provide a tunnel kiln construction whereby upper and lower banks of tubes and/or flues arranged in spaced horizontal planes are located so close to each other relative to their areas that heat is concentrated upon the upper and lower faces of large pieces of flat ware such as large grinding wheels.

Another object of the invention is to provide a tunnel kiln for the vitrification of grinding wheels up to 42 inches in diameter which can be built at a fraction of the cost for building conventional kilns for such purposes and which occupies a very much smaller space. Another object of the invention is to provide a gas fired

2 kiln which uses much fewer British thermal units of energy for the vitrification of a ton of ware than previous kilns. Another object of the invention is to provide a kiln having one or more of the characteristics indicated which requires far less heavy physical labor to operate than previous kilns.

Other objects will be in part obvious or in part pointed out hereinafter.

In the accompanying drawings, in which is shown one of various possible embodiments of the mechanical features of the invention:

Figure 1 is a side elevation on a smaller scale as compared with the remainder of the drawings, of a tunnel kiln constructed in accordance with this invention.

Figure 2 is a plan view showing how a plurality of batts support a single large grinding wheel to be vitrified and illustrating the rods upon which the batts slide.

Figure 3 is a plan view of the hydraulic ram with a fluid pressure system showing diagrammatically.

Figure 4 is a vertical longitudinal sectional view of the entrance and preheating end of the kiln.

Figure 5 is a fluid pressure diagram to show how the hydraulic mechanism for lifting the doors is actuated.

Figure 6 is a vertical longitudinal sectional view through the firing zone and part of the annealing zone of the kiln.

Figure 13 is a front end elevation of the kiln on the same scale as Figures 4, 6 and 7.

Figure 14 is a rear end elevation of the kiln on the same scale as Figures 4, 6 and 7.

Figure 15 is a sectional view taken on the line 15—15 of Figure 4 illustrating the ram and the guides for the ram to keep it from turning.

Figure 16 is a detailed cross sectional view on an enlarged scale illustrating the rollers which support the batts and the support for the rollers.

Figure 17 is a longitudinal sectional view of a refractory tube to receive a burner and also a longitudinal sectional view of such burner.

Figure 18 is an end elevation of the header for a burner.

Figure 7:
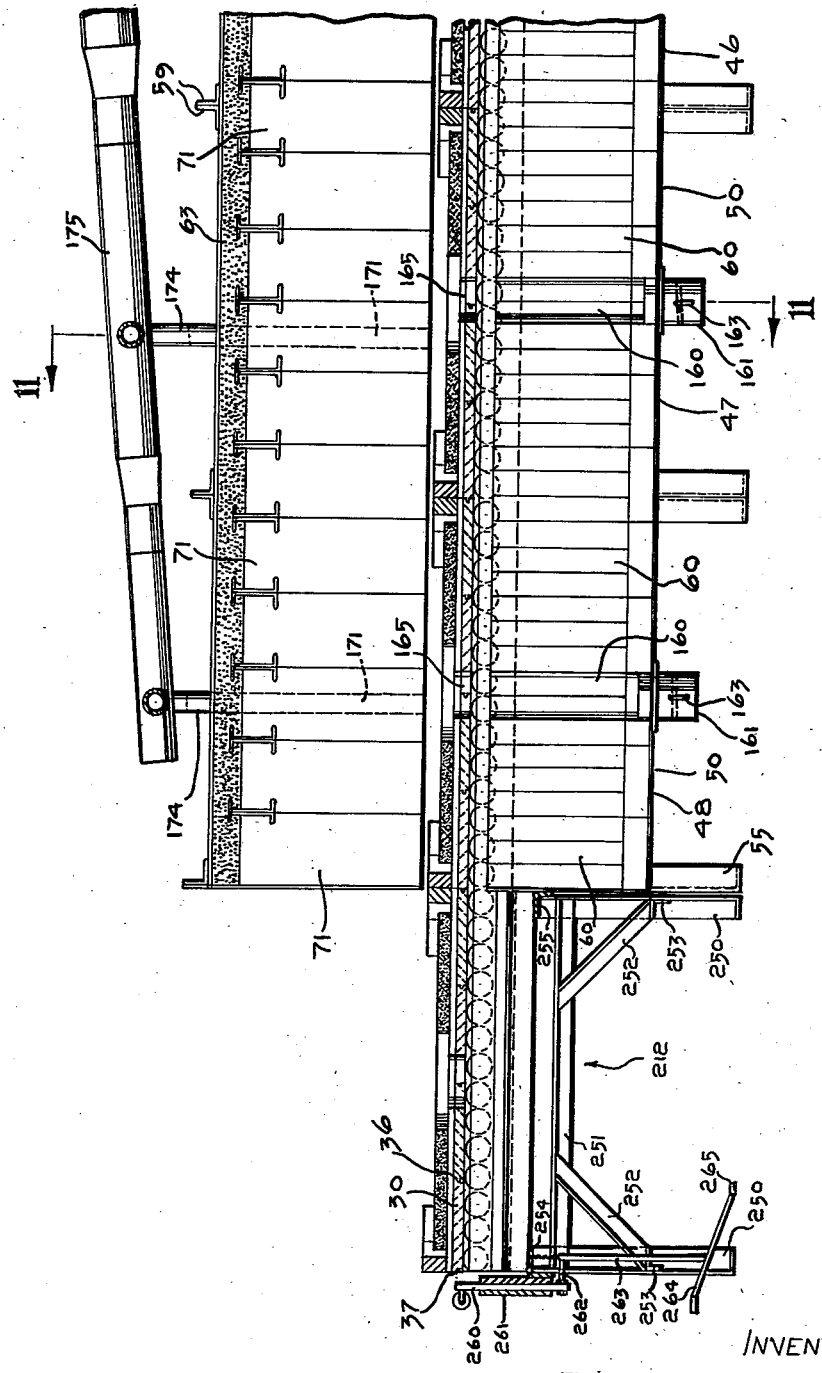
Figure 7 is a vertical longitudinal sectional view of the remainder of the annealing zone and the exit end of the kiln.

Referring first to Figure 2, in this illustrative embodiment of the invention, a unit which is moved through the kiln consists of four batts 30 which straddle the tunnel and slide on rods 31, six batts 32 which rest upon the batts 30 and extend parallel to the rods 31, four end baffles 33, two center baffles 34, and a grinding wheel to be vitrified 35. The baffles 33 and 34 and the grinding wheel 35 rest upon the longitudinally extending batts 32. The purpose of the baffles 33 and 34 is to form with the roof and sidewalls of the tunnel and the batts 30 and 32 a compartment for each grinding wheel as it is being preheated, as it is being fired, and as it is being annealed. These baffles accordingly have curved edges as shown. A pair of baffles 33 with a center baffle 34 form a segmental wall following the contour of part of the periphery of the grinding wheel 35. By using three pieces to form each baffle means ahead of and behind the grinding wheel fracturing of such baffle means due to heat shock or thermal differential is substantially eliminated.

Likewise the lower support for the grinding wheel 35 consists of four narrow batts 30 instead of a single batt in order that thermal differentials will be less liable to cause fracture. The upper support for the grinding wheel 35 consists of six batts 32 for the same reason. Each batt therefore is long in one dimension and relatively narrow. It has been found that narrow batts will withstand a great many cycles of heating and cooling whereas more or less square batts have a greater tendency to break when subjected to repeated cycles of heating and cooling.

Also by forming the batt support for the wheels in two layers of batts, that is to say a lower layer of batts 30 and an upper layer of batts 32 I provide a support which will withstand many more cycles of heating and cooling than if the batt or batts were in a single layer. Thus it may be said that the batts are not only narrow, they are also thin. There is another reason for supporting each wheel 35 by means of a plurality of batts. A batt in the form of a single thick plate or even in the form of a pair of thin plates superimposed upon each other will warp after a number of cycles of heating and cooling. In order to produce grinding wheels with plane sides these grinding wheels should have flat, that is to say plane surfaces to rest upon during vitrification. Another feature of the support for the wheels is the laying of the upper layer of batts 32 across instead of along the lower layer of batts 30. This helps to produce a level flat surface for supporting the wheels 35.

Figure 8:
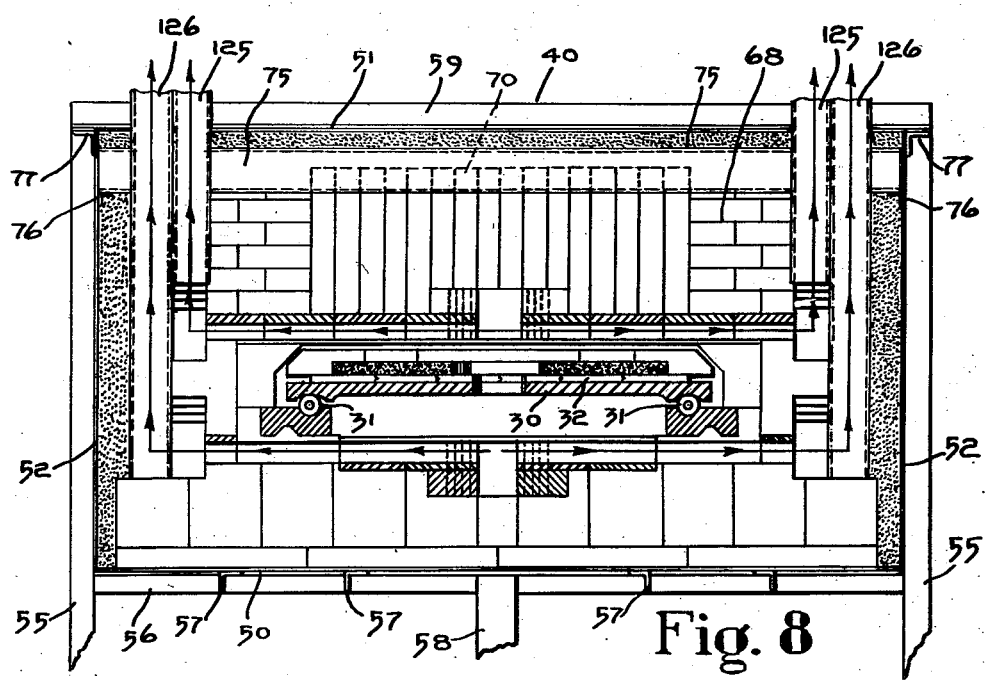
Figure 8 is a vertical cross sectional view of the kiln taken on the line 8—8 of Figure 4.
Figure 9:
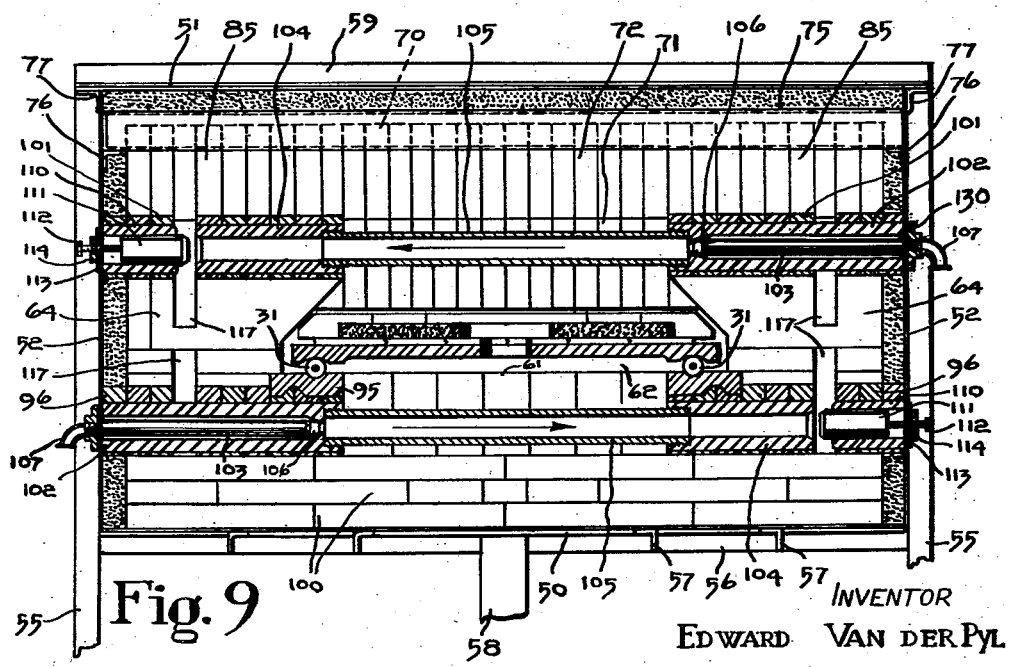
Figure 9 is a vertical cross sectional view of the kiln taken on the line 9—9 of Figure 6.
Figure 10:
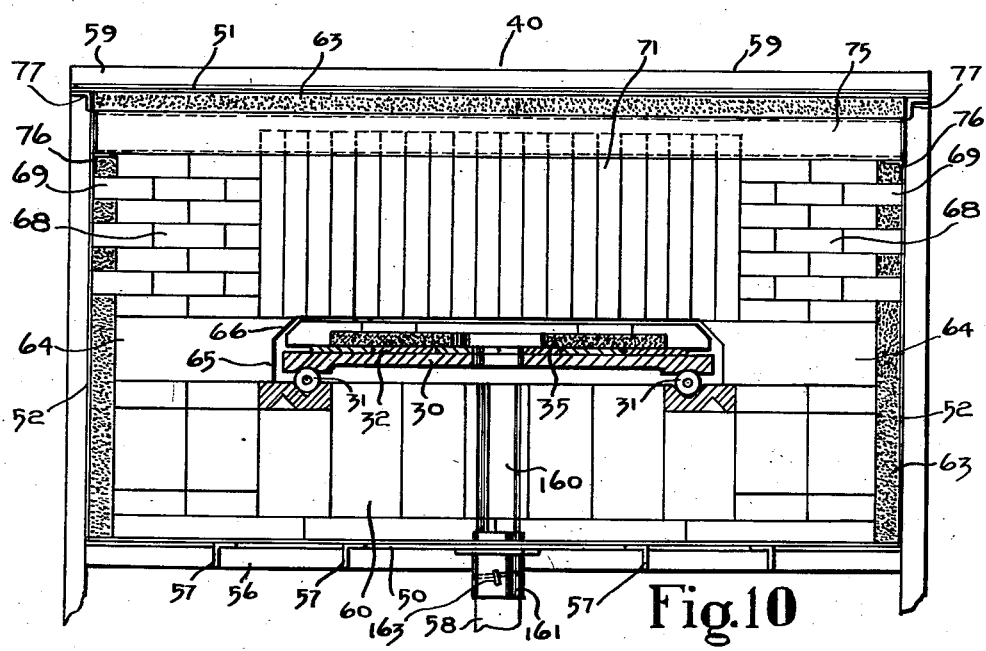
Figure 10 is a vertical cross sectional view of the kiln taken on the line 10—10 of Figure 6.

Referring now to Figures 4, 6 and 7, it will be seen that the batts 30 have a groove 36 at one end and a tongue 37 at the other end. These batts extend the entire length of the kiln in a long line of batts. As will be hereinafter described, they are pushed through the kiln by a force applied against the end batt at the entrance end of the kiln. Consequently each batt 30 is firmly pressed against adjacent batts and the tongue and groove junction will hold a broken batt in place if the adjacent batts are still whole. Preferably also the upper batts 32 have tongues and grooves as shown in Figures 8 to 10. As will be noted by reference to these figures, the batts 30 are a good deal thicker than the batts 32. Since the batts 30 are the ones which span the tunnel they are the primary conveyors of the load.

Referring now to Figure 1, the kiln may be constructed in a steel box 40 which has the form of a rectangular parallelopiped. As shown the box 40 has sections 41, 42, 43, 44, 45, 46, 47 and 48. Each section has a bottom plate 50, a top plate 51 and side plates 52, all being steel plates of which the plates 52 are welded to angle irons 55 constituting braces and legs to support the kiln and the plates. This structure therefore constitutes an elongated steel box 40 having merely one compartment on the inside. Welding is, nowadays, a very satisfactory method of constructing such a box. Further to strengthen the structure I provide as shown in Figures 8 to 11 angle irons 56 extending between the angle irons 55 and supporting the bottom plate 50, also angle irons 57 extending between the angle irons 56 and supporting the bottom plate 50 and a plurality of steel legs 58 extending from the bottom of the kiln to the floor at the longitudinal center line of the kiln. The top of the kiln is likewise desirably cross braced with angle irons 59.

Each section of the kiln is of substantially the length of the combined width of four batts 30 so a unit load such as shown in Figure 2 is located in each of the sections 41 to 48 when the kiln is in operation, and the ram hereinafter described is given a stroke sufficient to advance every unit load from one section to the next section. Therefore when the ram operates, each unit load, which includes a grinding wheel 35, is advanced one section, a unit load moves out from the section 48 at the exit end of the kiln, and a fresh unit load enters section 41 from the entrance end of the kiln. Sections 41 and 42 constitute a preheating zone, the ware being first heated to moderate temperature in the section 41 then heated to a higher temperature in the section 42. Section 43 is the firing zone where the ware is brought to the firing temperature and there maintained during the remainder of its stay in that section. Sections 44 to 48 inclusive constitute the annealing zone and in that connection the temperature becomes lower by gradations as the ware advances from section 44 to section 48. In an illustrative embodiment of this invention the temperature maintained in the section 41 is 600° C., the temperature maintained in the section 42 is 900° C., the temperature maintained in the firing zone is 1250° C. The annealing sections receive their heat from the unit loads but the respective temperatures in these sections is controllable to a considerable extent by the air circulatory system to be hereinafter described; in general the temperature of section 44 is maintained close to 1000° C., of section 45 close to 800° C., of section 46 close to 600° C., of section 47 close to 400° C., and of section 48 close to 200° C. Whenever one unit load moves in the kiln all the other unit loads must also move, consequently each unit load is in general maintained in each section for the same length of time. This time interval is, in the case of large grinding wheels such as 36 to 42 inches in diameter, 120 minutes.

In the several sectional views that are in Figures 4, 6, 7 and 8 to 12, it is assumed that the section was formed by removing bricks so that unless a brick had to be cut to show the section individual bricks are shown in elevation. This makes the drawings much easier to read. I will now describe the brick work of the kiln whereby the tunnel and flues are formed but in doing so I shall not individually mention all bricks or courses of bricks since the drawings are clear, but I will point out specific structural features which achieve or help to achieve the objects and advantages of the invention.

Figure 11:
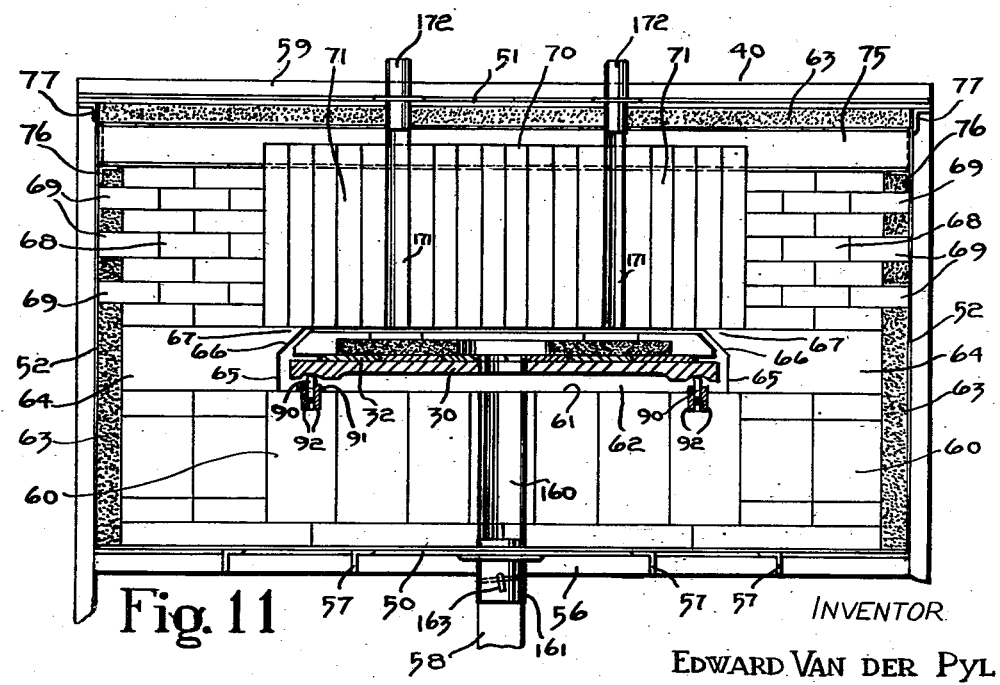
Figure 11 is a vertical cross sectional view of the kiln taken on the line 11—11 of Figure 7.

Since the kiln is more complex in the preheating and firing zones I shall start with the annealing zone specifically with with section 46 shown in Figure 11 and also in Figure 7. Resting on the bottom plate 50 is a mass of refractory bricks 60 making a rectangular parallelopipedal structure, the top face 61 of which is the bottom of the tunnel 62. This mass 60 stops just short of the side plates 52 leaving spaces which are filled with refractory insulating powder such as porous silica 63. Large bricks 64 continue the structure upwardly to form vertical sidewalls 65 of the tunnel 62 and also inclined walls 66 under overhanging portions 67 of the bricks 64. The structure is further continued upwardly by masses of bricks 68 on the sides of the kiln which are in general rectangular parallelopipeds whose outside vertical walls from a continuation of the outside vertical walls of the mass 60 and the bricks 64 but the masses 68 have individual courses 69 extending to the side plates 52. More porous silica is inserted between the plates 52 and the bricks 64 and masses 68 as shown.

The structure so far described provides the sides and bottom to the tunnel 62 but it needs a top. One feature of this invention is that the refractory roof of any section can be removed without removing the rest of the roof 70 carrying all of the sections. Another feature is the manner of carrying the roof load as will now be described.

Referring now to Figures 6, 7, 8, 9, 10 and 11, the tunnel roof 70 is made up of courses of bricks 71 in the preheating and annealing zone and courses of bricks 72 in the firing zone. Each brick of the courses 71 has a height the same as the height of the roof 70 at the preheating and annealing zones and each brick of the courses 72 has a height the same as the height of the roof 70 at the firing zone. In other words, the roof 70 is one brick high. But the height of the bricks of the courses 71 is greater than the height of the bricks of the courses 72 and as the top of the roof 70 is in a horizontal plane, it follows that the ceiling over the firing zone is higher than the ceiling over the preheating and annealing zones.

All of the bricks of the courses 71 and 72 are wider in the direction of the length of the tunnel 62 than they are in the direction of the width of the tunnel 62 as clearly shown in the drawings, and the horizontal cross section of all these bricks may be the same. These bricks are notched on the narrow faces at equal distances from the top, and the bottom flanges of channel irons 75 extend into the notches and support the bricks and hold them in place. As shown in Figure 9, the channel irons 75 are removably supported by angle irons 76 secured to the side walls 52 and thus the load of all of the bricks of the courses 71 and 72 is taken by the side walls 52. To remove the bricks of courses 71 or 72 of one of the sections it is sufficient to remove one or more top plates 51 and then to lift as by means of an overhead hoist those particular channel irons 75 supporting the bricks to be removed. In this way access can be gained to any part of the tunnel 62 in case of a smash. The top plates 51 are removably supported on the top edges of the side plates 52 and also on angle irons 77 secured to the outside of the side plates 52.

As shown in Figure 9, adjacent the courses of bricks 72 on either side thereof are courses of bricks 85 which may be of approximately the same size as that of the bricks of the courses 72, the courses of bricks 85 being also supported by the channel irons 75 and being between the masses of bricks 68.

Referring now to Figures 4, 6, 7 and 10, the batts 30 are thickened at the ends and grooved on the bottom and are supported by iron or steel rollers 90 at section 41 of the preheating zone and at sections 46, 47 and 48 of the annealing zone. These rollers 90 have integral trunnions 91 supported by parallel iron or steel bars 92 set in recesses in the mass of refractory bricks 60. The bars 92 of a pair of bars are parallel to each other and the opposite pairs of bars are parallel to each other and all of them are parallel to the side plates 52 so that they extend lengthwise in the tunnel 62 and opposite rollers 90 are spaced the same distance apart.

The rods 31 support the batts 30 in section 42 of the preheating zone and in the firing zone section 43 and in sections 44 and 45 of the annealing zone. These rods 31 are supported by grooved longitudinal refractory supporting members 95 some of which are supported on the mass of refractory bricks 60 while in the firing zone these members 95 are supported on courses of bricks 96 which in turn are supported by a mass of bricks 100 at the bottom of the kiln in the firing zone which like the mass 60 forms a rectangular parallelopiped but whose upper surface is considerably lower than the top face 61. The batts 30 may thus be pushed through the tunnel 62 and where the tunnel is extremely hot the support is entirely refractory, but where the tunnel is cooler the support is anti-friction. There is no metal part in the firing zone of the kiln or in the hottest sections of the preheating and annealing zones, but friction opposing sliding of the batts 30 is greatly reduced by the rollers 90 in the cooler sections.

Referring now to Figures 6 and 9, I provide courses of bricks 101 supported on the bricks 64 and having horizontal bores perpendicular to the side plates 52, these bores being at the same level with each other as are also corresponding horizontal bores in the courses of bricks 96. Alternate bores of the courses of bricks 101 on each side have refractory tubes 102 in which are located burners 103 and alternate bores of bricks 96 likewise have refractory tubes 102 supporting burners 103. The intermediate bores in each of the courses 101 and 96 have refractory flue tubes 104. Extending horizontally between each pair of a refractory tube 102 and a refractory tube 104 is a refractory combustion tube 105. This arrangement is such that opposite a refractory tube 102 there is always a refractory tube 104 and at either level the tubes 102 and 104 alternate and also below a tube 102 is a tube 104 and below a tube 104 is a tube 102.

The burners 103 have nozzles 106 at one end and connections 107 by means of which they may be connected to a suitable mixer which mixes combustible gas and air. When such burners are supplied with such a mixture under pressure and it is ignited, very hot flames issue from the nozzles 106. These hot flames are in fact blasts and they fill the combustion tubes 105 which consequently are heated to a bright red heat reaching a temperature well above 1250° C. maintaining the firing zone at the desired temperature, for example at 1250° C. The combustion tubes 105 are preferably made of silicon carbide. The other tubes 102 and 105 may be made out of fused aluminum oxide, the white porous variety now well known, or they might be made of mullite, natural or synthetic. These materials in granular form can be slip cast into tubes with threaded ends. A small percentage, usually about 1%, of some highly plastic clay such as the colloidal clay bentonite is added to the mix and the resultant tube is strong, very refractory and resistant to thermal shock.

The flames extend usually at least as far as the tubes 104 and sometimes well into them. Spaced from the refractory flue tubes 104 are short refractory tubes 110 which are normally plugged with refractory plugs 111 having bolts 112 screwed thereinto. Metal plates 113 are located on the bolts 112 and backed up by nuts 114. By means of the bolts 112 the refractory plugs 111 may readily be removed from the short refractory tubes 110 and then a lighted gas jet may be used to ignite the gases issuing from the burners 106, whereupon the plugs 111 are replaced. The plugs 111 may be made of alumina or mullite bonded as already described.

Figure 12:
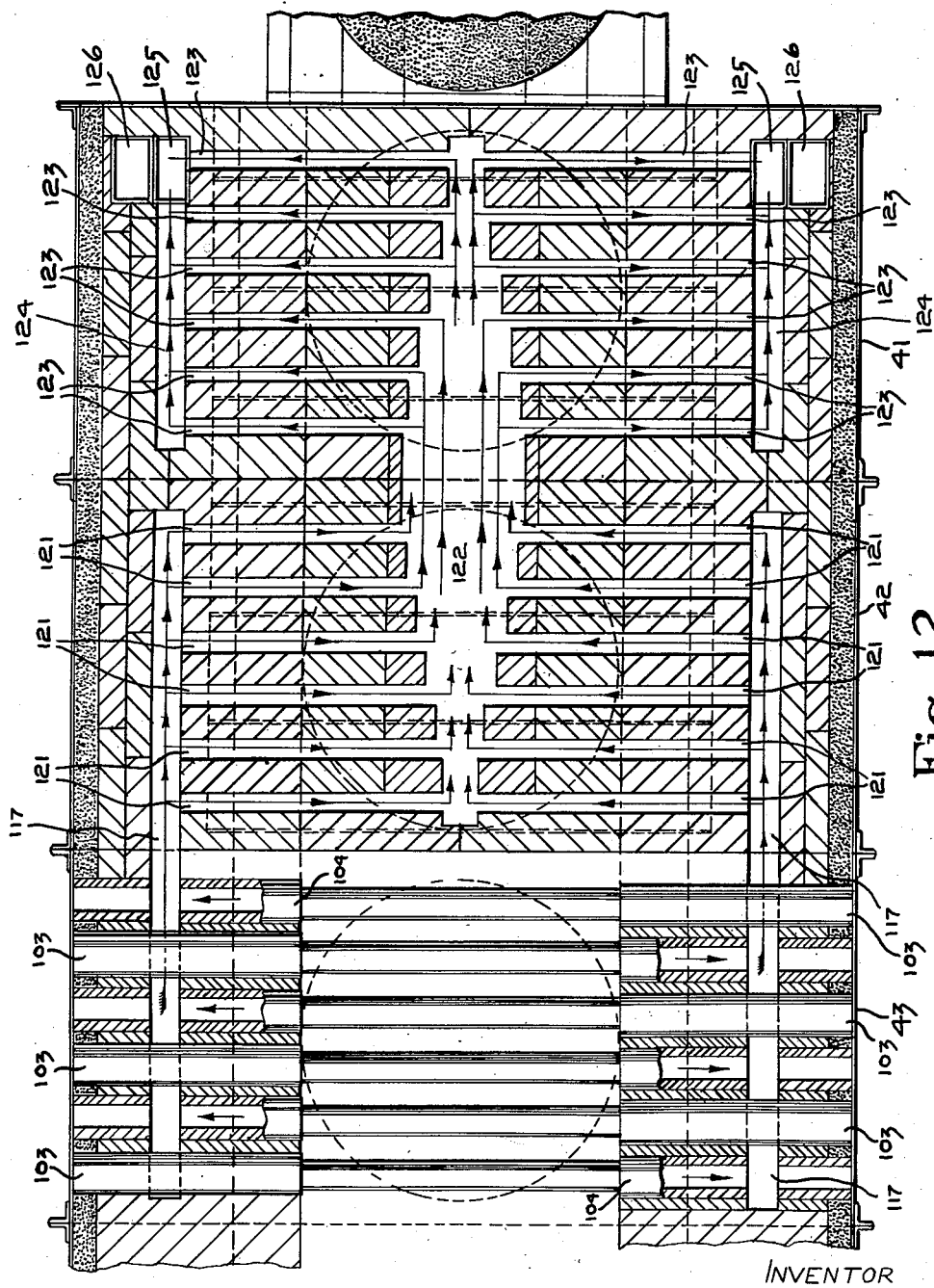
Figure 12 is a horizontal sectional view of the preheating and firing zones of the kiln taken along the line 12—12 of Figures 4 and 6.

Referring now to Figures 9 and 12, the bricks are cut and shaped to form long flues 117 open to the flue tubes 104 as clearly shown. In fact, the flue tubes 104 end at the insides of the flues 117 and the plug-containing short refractory tubes 110 terminate approximately at the outside of the flues 117. There are four of these flues 117, two of them on the upper level, one on each side, and two of them on the lower level, one on each side, and the upper flues on one side are right above the upper flues on the lower side, all as clearly shown. The burner tubes 102 extend through the flues 117 but are not connected thereto. Thus the upper flues 117 receive the hot exhaust gases from the upper bank of combustion tubes 105 while the lower flues 117 receive the hot exhaust gases from the lower bank of combustion tubes 105.

Figure 12 is, as stated, a sectional view taken on the line 12—12 of Figures 4 and 6, but it equally shows the flues above and below the tunnel 62, the upper flues being above refractory plates 120, Figure 4, and the lower flues being below refractory plates 120a, Figure 4. These refractory plates 120 and 120a have tongues and grooves as shown and fit nicely together to keep the exhaust gases in the flues and maintain the draught. They are preferably made of bonded silicon carbide which is highly refractory and also is a good heat conductor. They are relatively thin in order to transmit as much of the heat as possible to sections 42 and 41 of the tunnel 62.

As shown in Figure 12, each flue 117 is connected to six transversely extending flues 121 which are parallel to each other and connect to a large central flue 122. The latter is in turn connected to six transversely extending parallel flues 123 on each side leading to longitudinal flues 124. There are six flues 121 on each side above the tunnel 62 as well as below it, making twenty-four flues 121 in all. There are likewise six flues 123 on each side above and below the tunnel 62, making twenty-four flues 123 in all. There are two flues 122, one above and one below the tunnel 62.

The flues 124 are connected to vertical flues 125 and 126 (see now Figure 8) the flues 125, one on each side of the kiln, receiving gases from the upper flues 124 and the flues 126 receiving gases from the lower flues 124. One pair of flues 125 and 126 is connected to one chimney 127 on the right hand side of the kiln (see Figure 13) and the other pair of flues 125 and 126 is connected to the other chimney 127 on the left hand side of the kiln. These chimneys 127 have dampers 128 and the chimneys 127 overhang the front of the kiln and are supported by posts 129.

Referring now to Figure 17 which shows a refractory tube 102, a burner 103 and a nozzle 106 in cross section, each connection 107 is screwed into a header 130 which is screwed onto the end of a burner tube 131 which is preferably made of stainless steel. I preferably surround the burner tube 131 with a water jacket 132 which is sealed to the burner tube 131 at one end by means of an annular disc 133 and which is secured to the header 130 at the other end. In the header 103 are passages 134 and 135 to which pipes, not shown, are connected to convey water to and to remove water from the inside of the water jacket tube 132 and one of these passages such as the passage 135 has connected thereto a long pipe 136 so that the water will enter at one end of the tube 132 and leave from the other end thereof.

The burner tube 131 is externally threaded at each end being screwed into the header 130 at one end and being screwed into an adaptor 140 at the other end. This adaptor 140 is also preferably made of stainless steel. It has large external threads 141 which are screwed into an internally threaded end 142 of the nozzle 106 which should be made out of refractory material such as bonded aluminum oxide. The adaptor 140 also has an externally threaded reduced diameter end 143 onto which is screwed a flanged internally threaded coupling member 144 holding in position a flanged refractory disc 145 having a plurality of fine bores 146 through which emerge the gases of combustion. The coupling member 144 is partially seated in a cylindrical bore 147 in the nozzle 106 and this cylindrical bore 106 merges into an enlarged open ended counterbore 148 whence the flame issues and fills a combustion tube 105.

The header 130 may be secured to a sideplate 52 by means of bolts 150, see Figure 18 and preferably between these parts I provide a refractory washer such as an asbestos washer 151. The entire burner unit 103 is removable from its refractory tube 102 and in order to break it loose from the sidewall 52 to which it may be stuck by corrosive action assisted by the heat, I provide jack screws 153.

The refractory disc 145, which may be made of bonded aluminum oxide, with the many fine bores 146 divides the gases of combustion to produce a continuous homogeneous even flame and also helps to prevent backfiring. The water jacket 132 keeps the burner tube 131 at a relatively low temperature also to assist in preventing backfiring. Apparatus which is not a part of the present invention but is associated with the mixer cuts off the supply of gas to all the burners whenever one burner backfires. This of course upsets the operation of the kiln and so therefore it is desirable to prevent or reduce the occurrence of backfires. While therefore burners without water jackets might be used, it is preferable to use a water jacket such as shown and described. This burner unit assembly shown in Figures 17 and 18 and above described is illustrative of all of the burners 103.

Referring now to Figures 1, 7, 10, 11 and 14, I preferably provide convection cooling means for cooling each of the sections 44, 45, 46, 47 and 48. This convection cooling means is preferably controllable and adjustable because there usually will be times when cooling of one or more of these sections will not be done in order that these annealing sections may be kept at the desired temperatures for example at those temperatures previously mentioned. But if one or more of these sections 44 to 48 tends to become hotter than the desired temperature, the convection cooling means can be operated to bring it to the desired temperature.

At each of the sections 44 to 48 a vertical bore 160 is formed through the mass of refractory bricks 60 and extends right into the tunnel 62 and through the bottom plate 50. Extending into each of these vertical bores 160 is a short damper pipe 161 having a damper operated by a handle 163. Referring now to Figure 2, I preferably provide a hole 165 through the central batts of the six batts 32 and through the central batts of the four batts 30. Referring now to Figure 11, through the courses of bricks 71 at each of the sections 44 to 48, I provide vertical bores 171 there being two of these at each section one spaced on either side of the center line of the tunnel 62 about as indicated in Figure 11. These vertical bores 171 are connected by short pipes 172 which extend through the top plate 51 and through the porous silica 63 to pipes 174 which lead into a continuous length of piping 175 (made by connecting sections of piping if desired) which leads to a vertical pipe 176 extending upwardly to a chimney not shown.

In U. S. Letters Patent No. 2,034,721, to my colleague W. L. Howe, dated March 24, 1936, there is described and claimed a method of making a grinding wheel to induce a compressional strain adjacent to the central hole. This strain is also, in the patent and otherwise, referred to as a reverse strain because it is opposite to the strain which results from ordinary methods of annealing wheels. Howe found that wheels with such reverse strain had greater centripetal strength (ability to resist centrifugal force) than wheels annealed by ordinary methods. In Howe's method of annealing the central portion of the wheel particularly around the central hole is cooled ahead of the periphery. It will be seen that my kiln is adapted to apply the Howe method and to make reverse strain wheels for the cooling air passes through the central hole of the wheel, if desired.

In order that the kiln operator may know the temperature of each of the sections of the kiln a thermocouple should be provided for each section but it has not been deemed necessary to illustrate these thermocouples in the drawings.

Referring now to Figures 1, 3, 4 and 13, I provide a ram 180 having adjustable batt contacting studs 181 in order to propel the train of batts through the kiln. The ram 180 is secured by means of a nut 184 to the front end of a piston rod 185 secured to a piston 186 in a cylinder 187. A pipe 190 is connected to a source of fluid under pressure, conveniently to the city water supply system if this is a relatively high pressure system. A pipe 191 is connected to exhaust the fluid, for example it may be connected to the sewer. In a reversing valve casing 192 is a reversing valve 193 which may be shaped as shown and have passages as shown, or the reversing valve may be of any other construction. Pipes 190 and 191 are connected to the casing 192 and so are pipes 200 and 201 leading to opposite ends of the cylinder 187. In the pipe 200 is a throttle valve 203. Shunting the pipe 200 is a pipe 204 having a check valve 205 which allows the fluid to flow to the cylinder 187 but not from it. It will be seen that with the reversing valve 193 in the position shown in Figure 3, the front or left end of the piston 186 is under pressure. In order to move the train of batts the operator turns the reversing valve 193 by means of a handle, not shown, to connect the pipe 201 to the pipe 190 and the pipe 200 to the pipe 191. This causes the piston 186 to move forwardly and the studs 181 of the ram 180 to contact and push the end batt 32 and to push the entire train of batts, but at a controlled speed because the fluid must pass through the throttle valve 203.

When the train of batts has been pushed one station, that is to say by the distance of the sum of the widths of all of the batts 32 under one green wheel 35, to move the incoming wheel into section 41, the wheel that was in section 41 to section 42 and so on, the operator simply replaces the reversing valve 193 in the position shown in Figure 3, which causes the piston 186 to move rearwardly at unthrottled speed thus withdrawing the ram 180. The reversing valve 193 may also be used as a throttle valve by turning it more or less.

Referring now to Figure 1, I provide a table 210 at the entrance end of the kiln to receive an assembly of bats and a "green" wheel to be vitrified and connected to the table 210 I provide a table 211 to support the cylinder 187. Also at the exit end of the kiln I provide a table 212 to receive an assembly of batts with a wheel which has been vitrified.

Referring now to Figures 4 and 13, at the entrance end of the kiln is a rectangular frame 215 made out of four pieces of angle iron secured together and to the vertical front wall 216 (of iron or steel) of the box 40 which is the framework of the kiln. The flanges of these angle irons of the frame 215 that are parallel to the wall 216 extend inwardly of the frame 215. Spaced from the wall 216 are a pair of legs 217 which likewise may be made of angle irons. Extending between the legs 217 at two different levels are inverted channel irons 218 and 219 which may be secured to the legs 217 by welding. Supported by the frame 215 and by the lower channel irons 218 are long horizontal girders 220 which may be angle irons. Above the girders 220 are long horizontal girders 221 (channel irons) secured upon the channel irons 219 and also upon an angle iron 222 welded to the front wall 216.

Referring to Figure 13, extending from the angle iron 222 to the channel iron 219 is a pair of outside channel irons 224 so that the four channel irons 221 and 224 form a supporting structure in a horizontal plane. Across these channel irons 221 and 224 as shown in Figure 4 are four inverted channel irons 225 to provide an upper supporting plane of the table 210 to support angle irons 226 extending perpendicularly to the front wall 216. Secured between each pair of angle irons 226 is a pair of parallel iron or steel bars 92 supporting rollers 90 having trunnion pins 91.

Referring now to Figure 13, a pair of legs 228 connected by short angle irons 229 and 230 form the end of the table 211 and to this end are secured the four girders 220 and 221. Across the girders 221 are inverted channel irons 231 which support the cylinder heads 232 and 233 of the cylinder 187. In this manner the cylinder 187 is supported in position so that the ram 180 may propel the batts.

Referring now to Figure 15, upon the channel irons 225 are secured supporting brackets 236 to which are welded long rods 237 which guide the ram 180 to prevent it from turning as it pushes the batts.

Referring to Figure 16, the assembly of rollers 90 have integral trunnion pins 91 revolving in bushings 240 in the bars 92 as shown. The bars 92 are spaced apart by spacers 241 and held together by screws 242. By reason of this construction the rollers 90 are always freely rotatable and furthermore they will not wobble because their integral trunnion pins 91 provide journal surfaces well spaced from the center of the axis. The bushings 240 may extend inwardly beyond the rims of the rollers 90 to keep abrasive grit out of the bearings.

When starting the kiln the table 210 is loaded with batts 30 and 32 and a "green" wheel 35 as shown in Figure 3 and as also clearly indicated in Figure 4, the arrangement of the batts and the wheel as well as of the baffles 33 and 34 having already been clearly described and being shown in the drawings. Then, a door 245 at the entrance end of the kiln having been raised in a manner to be hereinafter described, the operator moves the reversing valve 193 to cause the ram 180 to move a unit load into the section 41. The burners 103 should have previously been lighted and burning long enough so that the firing zone section 43 is at the desired temperature and the preheating zone sections 41 and 42 are approximately at the desired temperature. In this connection it is noted that the batts, the ware, and especially the baffles 32 and 33 have a definite effect upon the temperature conditions so that it may be desirable to fill the kiln with unit loads including dummy ware in the nature of broken refractory pieces prior to sending into the tunnel 62 the first "green" grinding wheel 35 to be vitrified.

Howsoever that may be, after the ram 180 has been given a full stroke towards the tunnel 62, the operator moves the reversing valve 193 to cause the ram 180 to be retracted. Then another unit load can be placed on the table 210 and whenever desired the ram 180 can again be operated and this time it will push two unit loads, placing the first one to be introduced in section 42 and placing the second one to be introduced in section 41. In this way the tunnel 62 is filled, load by load, and when filled the tunnel contains a long line of loads with all of the batts 30 in contact with each other. The resistance to movement of these batts is not great since most of them are supported by the rollers 90 and only a few, for example those in the preheating zone section 42, those in the firing zone section 43 and those in the annealing zone sections 44 and 45 being supported by the rods 31.

When the tunnel 62 is full, introduction of another load from the table 210 will push a load out onto the table 212. As shown in Figure 14 the exit end of the kiln has a door 246 and as hereinafter described this door 246 is connected to the mechanism which raises the door 245 so that both doors 245 and 246 are simultaneously raised and lowered and thus if a load can be rammed into the kiln another load can move out of the kiln onto the table 212.

It is intended that, once the tunnel 62 of the kiln is loaded and the desired temperature gradients have been established between the various sections, a new load will be introduced into the tunnel 62 at stated intervals of time, for example every 120 minutes. It has been found that with a kiln as shown having eight sections this interval between the introduction of loads should probably not be much less than 60 minutes and preferably about 120 minutes and maybe as long as 180 minutes. Longer intervals of time would be time consuming and might upset the temperature gradients. However, the above figures are given for an eight section kiln. It is believed that a kiln according to this invention should probably have at least as many as eight sections if the kiln is of a size to vitrify 42-inch diameter wheels and the wheels 35 shown in the drawings are intended to represent 42-inch diameter wheels and the dimensions of the kiln as a whole are shown at least approximately proportional thereto. It is contemplated that in many cases it will be desirable to have more sections for example ten sections and by providing more sections the occurrence of batt breakage is considerably reduced. However, a kiln having eight sections and constructed as shown in this illustrative embodiment has been built and successfully operated. It is to be noted that the fracture of an occasional batt will not stop the operation of the kiln nor even spoil a grinding wheel in the same load due to the interlocking composite batt structure as already clearly described. It will be seen that the movement of the long line of loads and batts is intended to be intermittent, each ramming being relatively quickly accomplished and then the entire succession of loads remaining stationary, each one in its own particular section for a relatively long interval of time until the ram 180 is again operated to move all the loads introducing one into the tunnel from the table 210 and causing one to emerge from the tunnel onto the table 212. Of course when a load has emerged upon the table 212, the vitrified grinding wheel 35 is removed and the assembly of batts and baffles is also removed from the table 212 to be taken to the entrance end of the kiln to be reassembled and to have a "green" wheel 35 placed thereon. Naturally a considerable quantity of extra batts and baffles is kept on hand at the entrance end of the kiln so that it may not be necessary to wait for the old load to be picked up before assembling a new assembly of batts and baffles upon the table 210 and placing a "green" wheel 35 thereon.

Referring now to Figures 7 and 14, the table 212 may as well not be bolted to the floor since expansion of the entire kiln when it is fired is noticeable. The table 212 may or may not be secured to the kiln, but if it is not it should be lined up with the kiln from time to time. The table 212 may be supported by four legs 250 which may be angle irons and on the sides these legs are shown connected by horizontal angle irons 251 and braced by inclining angle irons 252 which rest upon horizontal transversely extending angle irons 253, all of these parts being welded together. To the top of the legs 250 at the outer end of the table 212 is welded an angle iron 254 and to the top of the legs 250 at the inner end of the table 212 is welded an angle iron 255. Inverted channel irons 256 (one on each side of the table) are welded to the top of the angle irons 254 and 255. A pair of angle irons 226 is secured to the top of each channel iron 256 and each pair holds in place a pair of the parallel iron or steel bars 92 supporting rollers 90 in the manner already described. Thus a load may move out onto the table 212 at any time that it is empty.

I preferably provide means for preventing a load from overrunning the table 212 and crashing onto the floor and, as shown in Figures 7 and 14 this may comprise a vertically slidable stop plate 260 normally in position to engage an advancing batt 30, the stop plate 260 being held by a slideway bracket 261. The stop plate 260 extends to the underside of the slideway bracket 261 and has a bolt 262 extending through it and through a link 263 which is connected to a treadle 264 pivoted to the floor by means of a pivot bracket 265, the treadle 264 being connected to the angle iron 254 by means of a spring 266 normally to hold the stop plate 260 in the upper position. In order to lower the stop plate 260 to slide the batts 30 off the table 212 the operator has only to step on the treadle 264. The treadle 264 may be placed at an angle as shown, that is to say neither parallel to nor perpendicular to the end wall 270 at the exit end of the kiln in order that it shall not take up too much room.

Referring now to Figures 4, 13 and 14, connected to the door 245 are cables 271 which extend upwardly and over pulleys 272 secured to the top of the kiln and then inwardly to pulleys 273 and then to a piston rod 274 to which they are fastened. To the bottom of the door 245 are secured cables 276 which extend downwardly around pulleys 277 fastened to the angle iron 222 and then the cables 276 extend upwardly to pulleys 278 fastened to the top of the kiln whence the cables 276 extend along the length of the kiln to the exit end thereof and over pulleys 280 fastened to the end wall 270 whence the cables 276 extend downwardly and are secured to the door 246. It will thus be seen that when the piston rod 274 is retracted into a cylinder 281 in which it is located the doors 245 and 246 are raised as shown. When the piston rod 274 is moved outwardly of the cylinder 281 the doors will be lowered to seal the tunnel 62. In Figure 5, the cylinder 281 is shown diagrammatically and as shown the piston rod 274 is connected to a piston 282 and the ends of the cylinder 281 are connected by pipes 283 and 284 to a reversing valve casing 285 in which is a reversing valve 286. A pipe 290 is connected to a source of fluid under pressure, again conveniently to the city water supply system, and a pipe 291 is connected to exhaust the fluid, for example it may be connected to the sewer. The reversing valve 286 may be shaped as shown and have passages as shown or it may be of any other suitable construction. This mechanism is or may be similar to that already described to move the ram 180. The operator moves the reversing valve 286 by a handle, not shown, and thus may open or close the doors and like the reversing valve 193 the reversing valve 286 may also be used as a throttle valve by turning it more or less. The valves and the piping connected thereto may in actual practice be located in any convenient position, for example they may be mounted on the table 211 and when they are placed together the operator may control both the doors 245 and 246 and the ram 180 from the single station. The doors should be closed, that is to say down, excepting when a load is actually being moved by the ram 180.

As shown in Figures 13 and 14, the doors 245 and 246 have cut-outs 295 to straddle the rollers 90 and the parallel bars 92. They may be made out of steel plate. Preferably also these doors 245 and 246 have peep holes 296 guarded by pivoted plates 297. The door 245 is guided by a pair of angle irons 300 welded to the frame 215 and the door 246 is guided by a pair of angle irons 301 welded to the end wall 270.

It will thus be seen that there has been provided by this invention a tunnel kiln in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A tunnel kiln for the vitrification of grinding wheels and like ware comprising a refractory structure forming a long tunnel said tunnel being divided into a preheating zone a heating zone and an annealing zone, a plurality of flat rectangular refractory ceramic batts in said tunnel in contiguous relation to each other from end to end of the tunnel said batts having upper surfaces which together extend in a plane through the tunnel, a pair of refractory supports for the batts one on each side of the tunnel and each extending entirely through the heating zone and into part of the preheating zone and into part of the annealing zone, said refractory supports having straight line grooves in their upper surfaces which grooves extend entirely through the heating zone the line of the grooves in the support on one side being parallel to the line of the grooves in the support on the other side, a plurality of refractory rods in and extending the length of each of said grooves in end to end relation forming a pair of continuous rod supports for the batts in the heating zone of the tunnel, a pair of lines of aligned rollers on parallel axes perpendicular to the length of the tunnel in part of the preheating zone, and a pair of lines of aligned rollers on parallel axes perpendicular to the length of the tunnel in part of the annealing zone, all of said rollers supporting batts with their upper surfaces in the aforesaid plane, the batts being supported everywhere in the tunnel either by the rods or by the rollers.

2. In a tunnel kiln as claimed in claim 1, the combination with the parts and features therein specified, of combustion tubes above the supporting means in the heating zone.

3. In a tunnel kiln as claimed in claim 1, the combination with the parts and features therein specified, of combustion tubes both above and below the supporting means in the heating zone.

4. In a tunnel kiln, a roof removable course by course comprising a series of courses of bricks, each course extending transversely of the tunnel, each brick having on opposite vertical sides thereof a horizontal groove, a pair of supporting girders for each course said girders each having one side with a vertical plane face without projections and on the other side a flange extending into the grooves in all of the bricks of a course of bricks, whereby a pair of girders on opposite sides of a course of bricks supports said course of bricks and many courses of bricks can be placed close to each other when the aforesaid vertical plane faces of the girders are placed in contact with each other, and whereby any course of bricks can be removed from the roof by lifting the pairs of girders supporting it.

5. In a tunnel kiln, a refractory structure forming a tunnel, said tunnel having a heating zone, a set of transversely extending refractory combustion tubes at an upper level in said tunnel in said heating zone, a set of transversely extending refractory combustion tubes at a lower level in said tunnel in said heating zone, said set at the upper level being opposite said set at the lower level, each tube having at one end thereof a burner but alternate tubes at each level having the burners at opposite ends thereof, and refractory means in the tunnel at the heating zone thereof located between the combustion tubes at the upper level and the combustion tubes at the lower level to guide batts through the heating zone.

6. In a tunnel kiln as claimed in claim 5, the combination with the parts and features therein specified, of flue tubes connected to the combustion tubes, each such flue tube being at the end of a combustion tube opposite to the end at which the burner is located.

7. In a tunnel kiln as claimed in claim 6, the combination with the parts and features therein specified, of refractory tubes surrounding the burners.

EDWARD VAN DER PYL.

REFERENCES CITED

The following references are of record in the file of this patent:

UNITED STATES PATENTS

| Number | Name | Date |
|---|---|---|
| 305,599 | Kandeler | Sept. 23, 1884 |
| 379,924 | Anderson | Mar. 27, 1888 |
| 671,990 | Drescher | Apr. 16, 1901 |
| 1,416,726 | McDougal | May 23, 1922 |
| 1,477,152 | Robertson | Dec. 11, 1923 |
| 1,482,087 | Miller | Jan. 29, 1924 |
| 1,562,441 | Curtis | Nov. 24, 1925 |
| 1,802,235 | Campbell | Apr. 21, 1931 |
| 1,862,548 | Prouty et al. | June 14, 1932 |
| 1,867,318 | Hull | July 12, 1932 |
| 1,970,320 | Kier et al. | Aug. 14, 1934 |
| 2,086,971 | Wilson et al. | July 13, 1937 |
| 2,137,091 | McDougal | Nov. 15, 1938 |
| 2,314,507 | Minter | Mar. 23, 1943 |
| 2,320,172 | Brooke et al. | May 25, 1943 |
| 2,534,127 | Howe | Dec. 12, 1950 |

FOREIGN PATENTS

| Number | Country | Date |
|---|---|---|
| 550,265 | France | Mar. 2, 1923 |
| 365,614 | Great Britain | Jan. 15, 1932 |
| 475,409 | Great Britain | Nov. 15, 1937 |